United States Patent [19]
Stephenson et al.

[11] Patent Number: 5,896,477
[45] Date of Patent: Apr. 20, 1999

[54] OPTICAL FIBER COUPLING BUILDOUT SYSTEM

[75] Inventors: Daniel Lee Stephenson, Lilburn; Thomas Nelson Toornman, Buford, both of Ga.

[73] Assignee: Lucent Technologies Inc., Murray Hill, N.J.

[21] Appl. No.: 08/857,402

[22] Filed: May 16, 1997

[51] Int. Cl.⁶ .................................................. G02B 6/36
[52] U.S. Cl. ............................................................ 385/53
[58] Field of Search .................................... 385/52–63, 78, 385/84, 88–92, 147

[56] References Cited

U.S. PATENT DOCUMENTS

| | | | |
|---|---|---|---|
| 5,067,783 | 11/1991 | Lampert | 385/60 |
| 5,123,071 | 6/1992 | Mulholland et al. | 385/53 |
| 5,212,752 | 5/1993 | Stephenson et al. | 385/78 |
| 5,274,729 | 12/1993 | King et al. | 385/134 |

OTHER PUBLICATIONS

Japanese Industrial Standard "FO4 Type Connectors for Optical Fiber Cords," Translated and Published by Japanese Standards Association.

Standards Proposal No. 3143–B. Proposed New Standard "FOCIS 3. Fiber Optic ConnectorIntermateability Standard," prepared by the TIA FO–6.3 Subcommittee on Fiber Optic Interconnecting Devices.

*Primary Examiner*—Akm E. Ullah

[57] ABSTRACT

An improved SC fiber optic coupling is disclosed which fits within a standard SC footprint when panel mounted but which provides for a buildout whereby it may be readily cleaned yet it may be used to replace SC panel couplings having the minimum footprint required by the Telecommunications Industry Association standard for SC couplings, FOCIS 3. Fiber Optic Coupling Intermateability Standard (TIA/EIA-604-3) which provides for the dimensions to be used by SC couplings. The present invention also provides a buildout system for fiber optic connectors which allows such connectors to be assembled without any rotation therebetween. Accordingly, the present invention can be used with SC, ST, LC, and FC connectors to provide a non-rotational connection, and it can be used to manufacture ganged fiber optic coupling buildouts.

9 Claims, 6 Drawing Sheets

5,896,477

OPTICAL FIBER COUPLING BUILDOUT SYSTEM

TECHNICAL FIELD

The present invention relates to an optical fiber coupling buildout system.

More particularly, the invention relates to a system of buildouts and buildout blocks which are used in optical fiber panels for making connections. The invention is intended to replace a standard SC coupling with a buildout which is sized to fit in the space allowed for a standard SC coupling. In addition, the present invention can be used with other types of standard fiber optic connectors, including, but not limited to ST, LC, and FC connectors, in order to provide a non-rotational connection, as will be explained hereinafter.

BACKGROUND OF THE INVENTION

Couplings for optical fiber communication systems are well known. It is often necessary to arrange a plurality of optical fiber couplings in a panel in order to facilitate multi-fiber connections. Desirably, devices for holding couplings are mounted in the panel, but the couplings themselves are not connected to incoming or outgoing fiber paths until actually needed to provide service. Devices which are mounted in a panel to accommodate interconnections are commonly referred to as "buildout blocks" or, simply, "buildouts."

As is known and understood by those skilled in the art, it is common practice in the optical coupling art to terminate a length of optical fiber with a coupling. Once such type of optical fiber coupling which is used for terminating and connecting two optical fibers is referred to as an ST® coupling. ST® is a registered trademark of Lucent Technologies Inc. The ST® coupling is disclosed, for example, in U.S. Pat. No. 4,934,785, which issued on Jun. 19, 1990 to T. D. Mathis and Calvin M. Miller. A buildout for an ST coupling is described in U.S. Pat. No. 5,067,783, which issued on Nov. 26, 1991 to N. R. Lampert. Another type of optical fiber coupling is the SC type coupling that is shown and described in U.S. Pat. No. 5,212,752, issued to D. L. Stephenson, et al. In U.S. Pat. No. 5,274,729, which issued to King, et al. ("the '729 patent"), a variety of couplings for buildout systems are described.

In addition, in U.S. patent application Ser. No. 08/563,067, filed Nov. 27, 1995 by D. L. Stephenson, et al. a "shutter" used to close the end of a connector, in order to prevent dust from entering, is described.

As is understood by those skilled in the art, the couplings which mount in the panel are inserted from the front side of the panel and then they clip into the panel. From behind the panel a fiber optic cable which is terminated in a coupling having a ferrule is inserted. If the ferrule is not exposed, i.e., if it is enclosed in a sleeve, cleaning the end of the ferrule is extremely difficult if not impossible. Yet another problem with the couplings of the prior art is that they required the rotation of the buildout, while it was still in the block, in order to remove the buildout. The rotation of the buildout would damage the fiber end face if one of the two mated connectors was not removed.

In order to eliminate these problems, a buildout for an SC coupling has been developed. A problem with the buildout which is disclosed in the '729 patent is that its "footprint" does not fit within the Telecommunications Industry Association standard for SC couplings. FOCIS 3, Fiber Optic Coupling Intermateability Standard (TIA/EIA-604-3) which provides for the dimensions to be used by SC couplings. Accordingly, while the existing buildout works with SC couplings, which are panel mounted, if someone was to build a panel which complied with the minimum separations set for SC couplings, the SC buildout coupling of the prior art could not be used, since adjacent couplings would not fit on the panel. In view of the above, it would be desirable to have an SC coupling which could be panel mounted and which would provide a buildout whereby the cleaning of the ferrules could be facilitated.

SUMMARY OF THE INVENTION

In accordance with the present invention, a buildout system for optical fiber couplings is described. The buildout system comprises a buildout block which has a longitudinal axis, the rear portion of the buildout block is capable of having secured thereto a coupling and a front portion thereof is adapted to receive at least one buildout and having a latching arrangement. The system further comprises a buildout, which in the preferred embodiment has a substantially rectangular cross-section in a plane normal to said longitudinal axis. The front portion of the buildout is capable of being secured to a coupling. The rear portion of the buildout is adapted to be assembled to the front portion of the buildout block. The buildout is capable of being assembled to at least one buildout block. The buildout has a latching arrangement comprising a plurality of legs which cooperatively attach with a latching arrangement of the buildout block to hold the buildout assembled to the buildout block.

While the present invention is described with reference to an SC coupling, it may be used with other fiber optic couplings, including ST, LC, and FC couplings in order to provide a connection which does not require a rotational connection.

Due to the fact that the present invention allows for close spacing of buildouts, without the need for rotational attachments, it is now possible to provide a ganged fiber optic coupling buildout which can be molded in single or multiple port versions.

DETAILED DESCRIPTION OF A PREFERRED EMBODIMENT OF THE INVENTION

Figure 1:
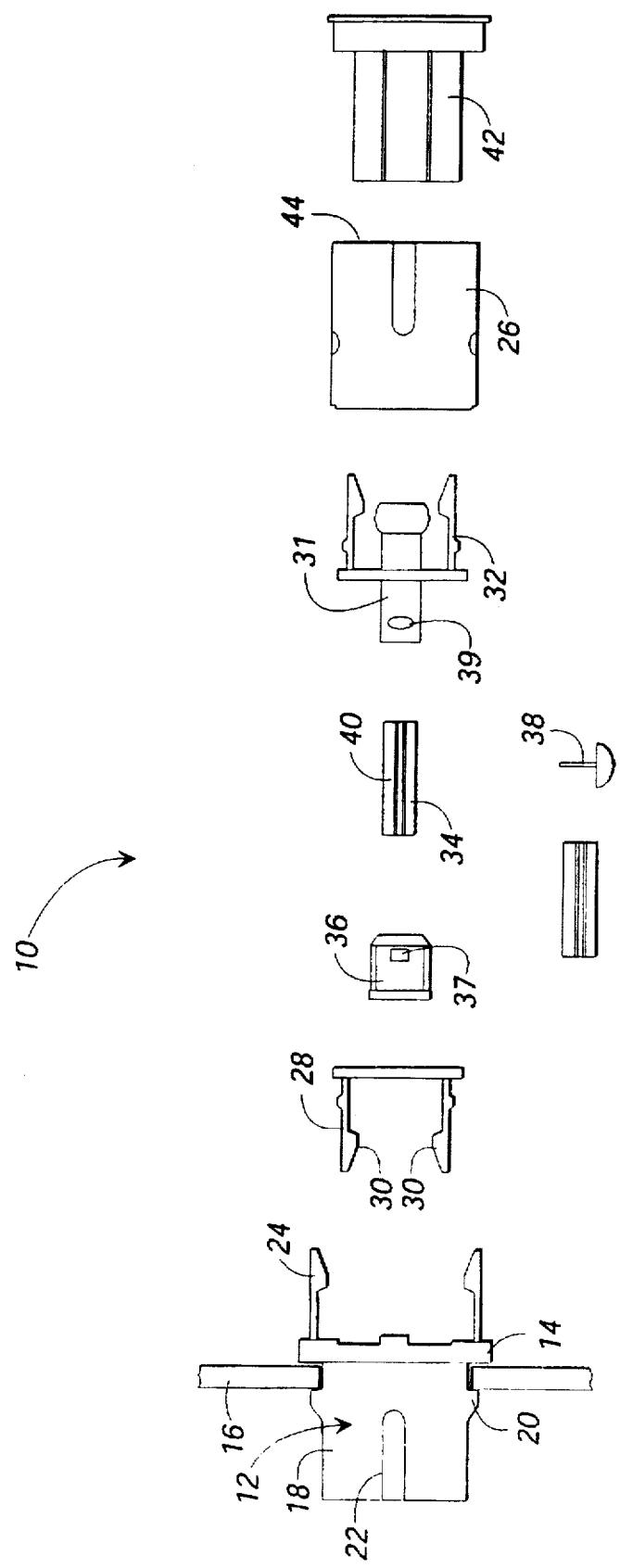
FIG. 1 is an exploded side view illustrating the parts which make up the coupling of the present invention.

Referring to FIG. 1, a first exploded view of the SC coupling 10 in accordance with the present invention is shown. As set forth above, those skilled in the art will recognize that the present invention can be used with fiber optic couplings other than SC couplings, such as ST, LC, and FC couplings. The present description should, therefore, be understood to be one of an exemplary embodiment illustrating an SC coupling, but it should not be regarded as limiting the invention to use only with SC connectors.

Figure 2:
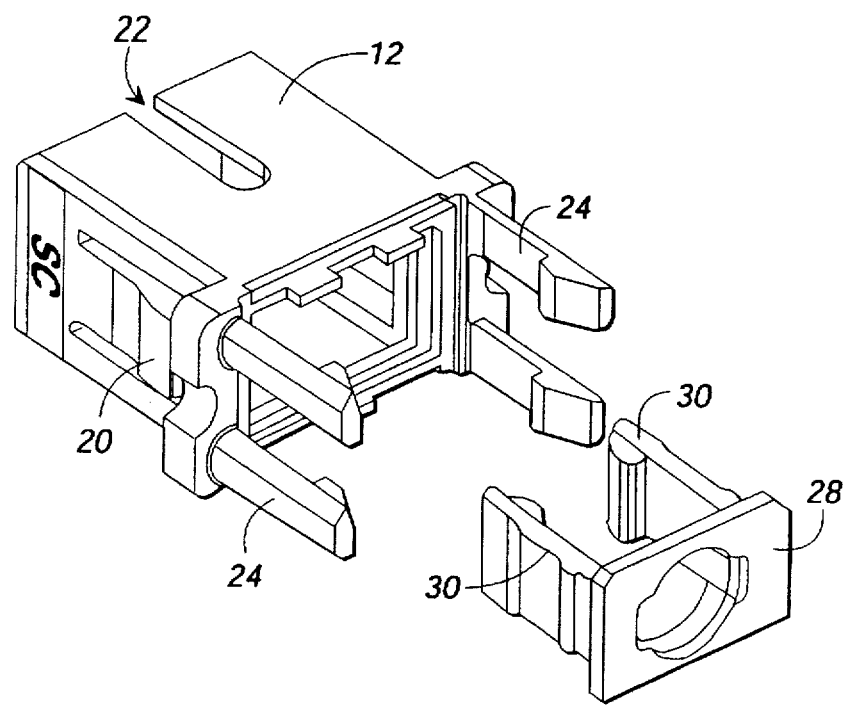
FIG. 2 is an exploded perspective view of the block of FIG. 1.
Figure 3:
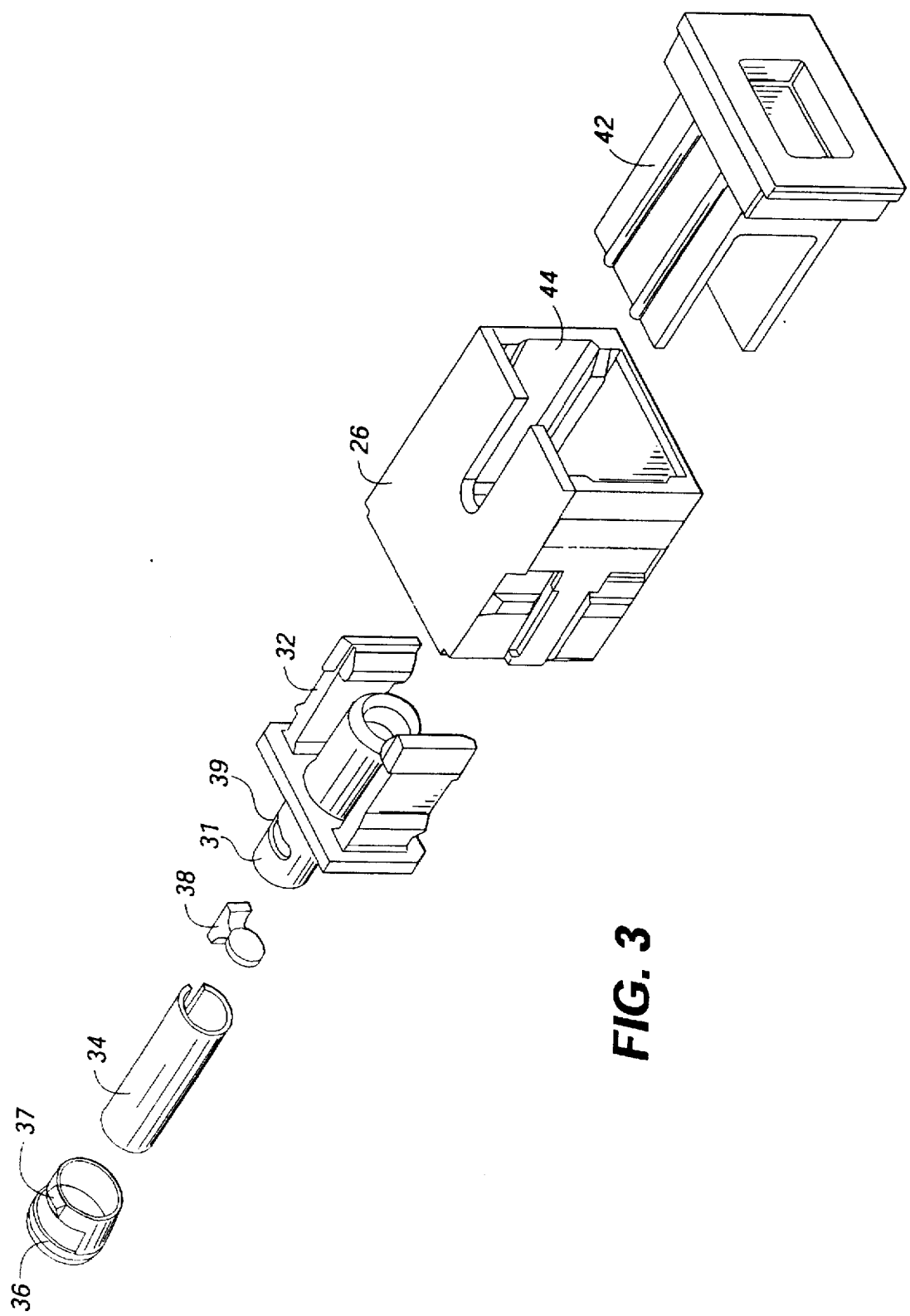
FIG. 3 is an exploded perspective view of the housing portion of the coupling of FIG. 1.

With reference to FIGS. 2 and 3, perspective views of the elements illustrated in FIG. 1 are shown. The coupling 10 is comprised of a series of components which snap together in the preferred embodiment of the invention. In particular, the coupling 10 is comprised of a block 12 (FIGS. 1 and 2) which has an outer portion having a flange 14 formed thereon which is of a dimension which prevents the outer portion of the block 12 from passing through an opening formed in a panel 16.

A rear portion 18 of the block 12 fits within the opening in the panel 16. Sloped (or cammed) portions 20 allow the block 12 to pass through the opening in the panel 16 and lock into place in the panel 16. In the standard manner known in the SC coupling art, there is an elongated opening or key 22 along a top surface of the rear portion of the block 12. A unique aspect of the present invention is that the widest portion of the footprint of the block 12 on the outside of the panel 16 is the flange 14 which prevents the block 12 from passing through the opening in the panel 16.

In accordance with the invention, the block 12 also includes at least one, and preferably a set of, retaining latch legs 24 which will be used, as explained below, to retain a housing 26 when an external connector (which has been attached to the housing 26) is snapped into the SC coupling 10. The block 12 further includes a latch insert 28 which extends into and snaps into the block 12. The purpose of the latch insert 28 is to provide appropriately formed, internal cammed surfaces 30 which are used to retain a connector which inserts into the block 12.

With continued reference to FIGS. 1 and 3, the SC coupling 10 further comprises a sleeve 34 which fits into the tubular portion 31 of the sleeve housing 32, where it is held in place by a retainer 36. The retainer 36 includes raised portions 37 which snap into openings 39 when the retainer 36 is snapped onto the tubular portions 31 of the sleeve housing 32. As will be obvious to those skilled in the art, an attenuating element 38 is configured so that it may be fitted into a slot 40 which is formed in the sleeve 34. The element 38 is used in the standard manner to disburse light from a fiber which has been attached to the housing 26 whereby the energies of light on different fibers can be equalized or optimized for performance. Finally, with continued reference to FIGS. 1 and 3, a dust cover 42, or shutter, is optionally provided for the opening 44 which extends into one end of the housing 26, whereby dust or other contaminants can be kept out of the housing 26.

Figure 4:
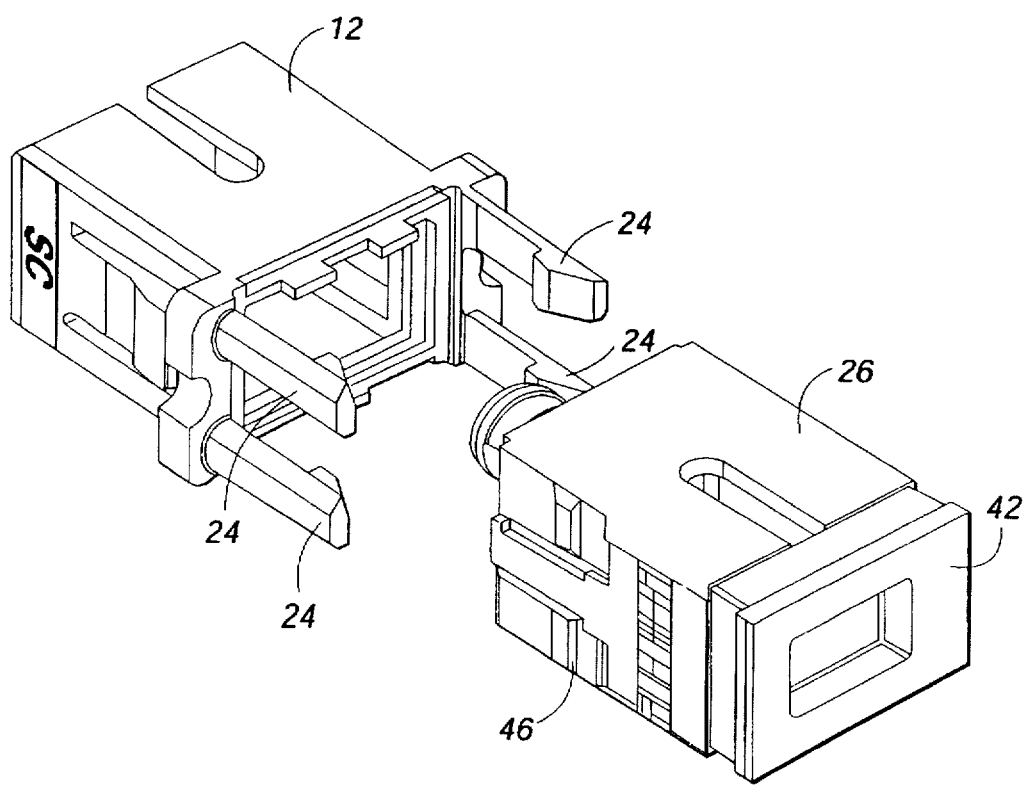
FIG. 4 is a perspective view showing how the block and the housing fit together.
Figure 5:
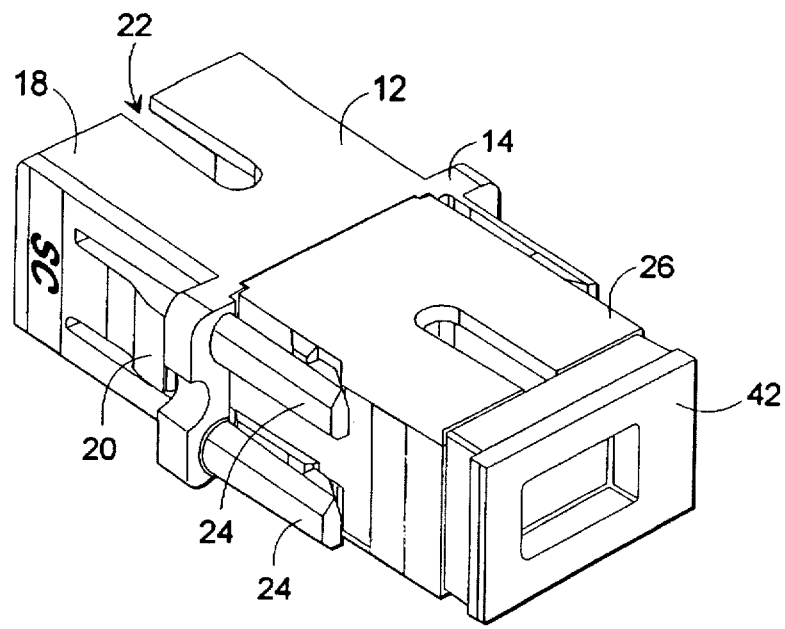
FIG. 5 is a perspective view showing the block and the housing connected together.
Figure 6:
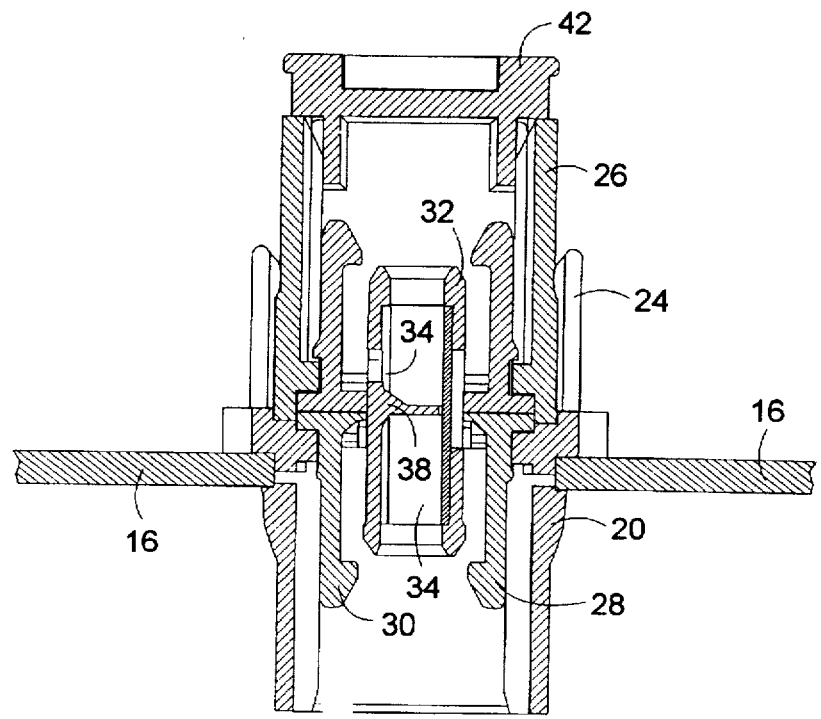
FIG. 6 is a cross-sectional top view of the assembled block and housing.

Referring now to FIG. 4, there is a perspective view illustrating how a completed housing 26 can be fitted into a block 12 whereby the retaining latch legs 24 can mate with associated cam portions 46 on the housing 26, thereby attaching the housing 26 to the block 12 and retaining it thereon. The attached units are illustrated in FIGS. 5 and 6.

Figure 7:
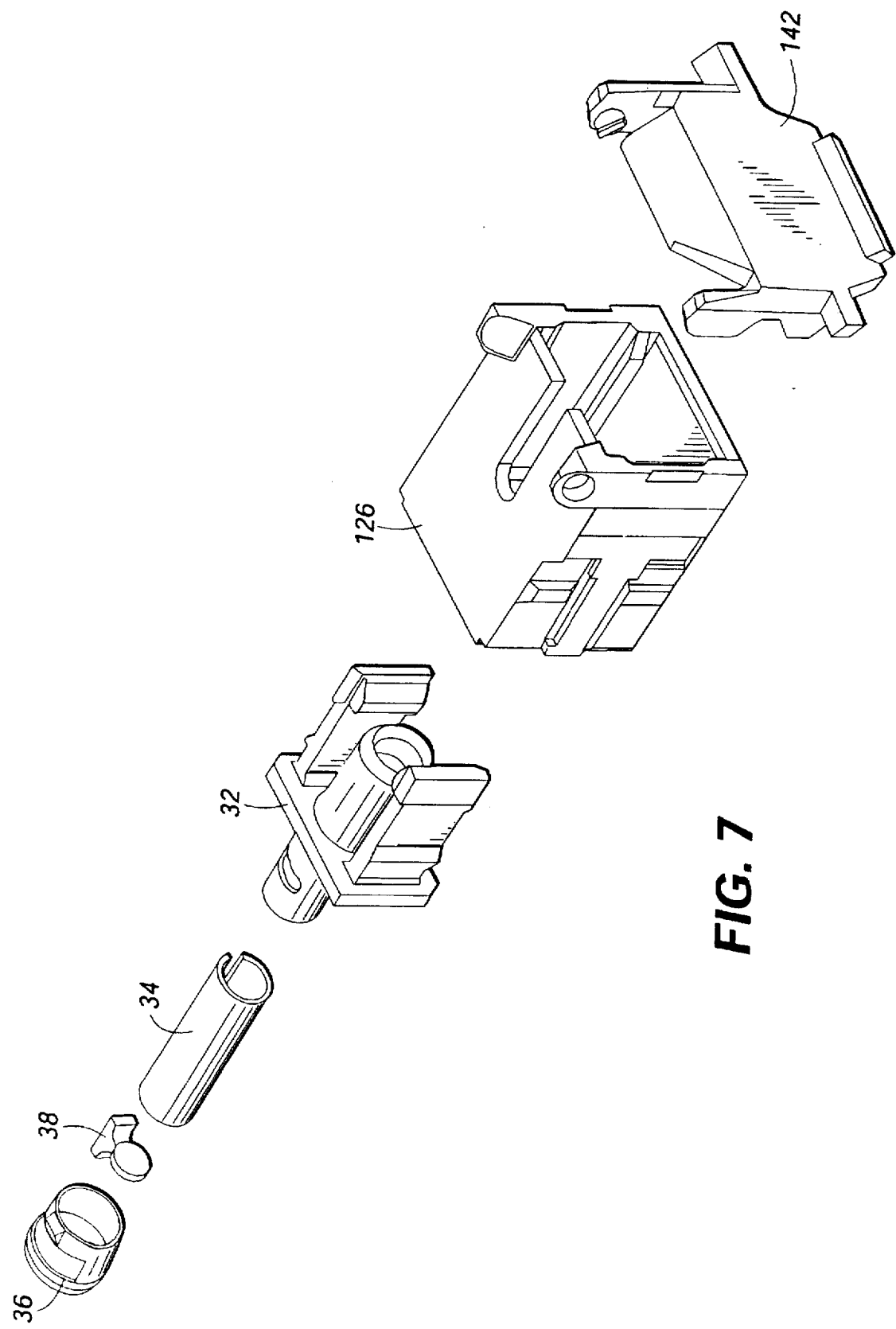
FIG. 7 is an exploded perspective view of an alternative embodiment of the housing which includes an integrated dust cover.

Referring to FIG. 7, in an alternative embodiment of the present invention, a housing 126, illustrated in FIG. 7 can replace the housing 26 of FIG. 2. In the embodiment illustrated in FIG. 7, an integrated dust cover cap 142 is used instead of the removable dust cover shown in FIG. 2.

The buildout of the present invention avoids the problems of the buildouts of the prior art in that it can be connected using a straight movement, without any need for rotation. In addition, it fits within the panel area prescribed by the appropriate standards for SC couplings.

Figure 8:
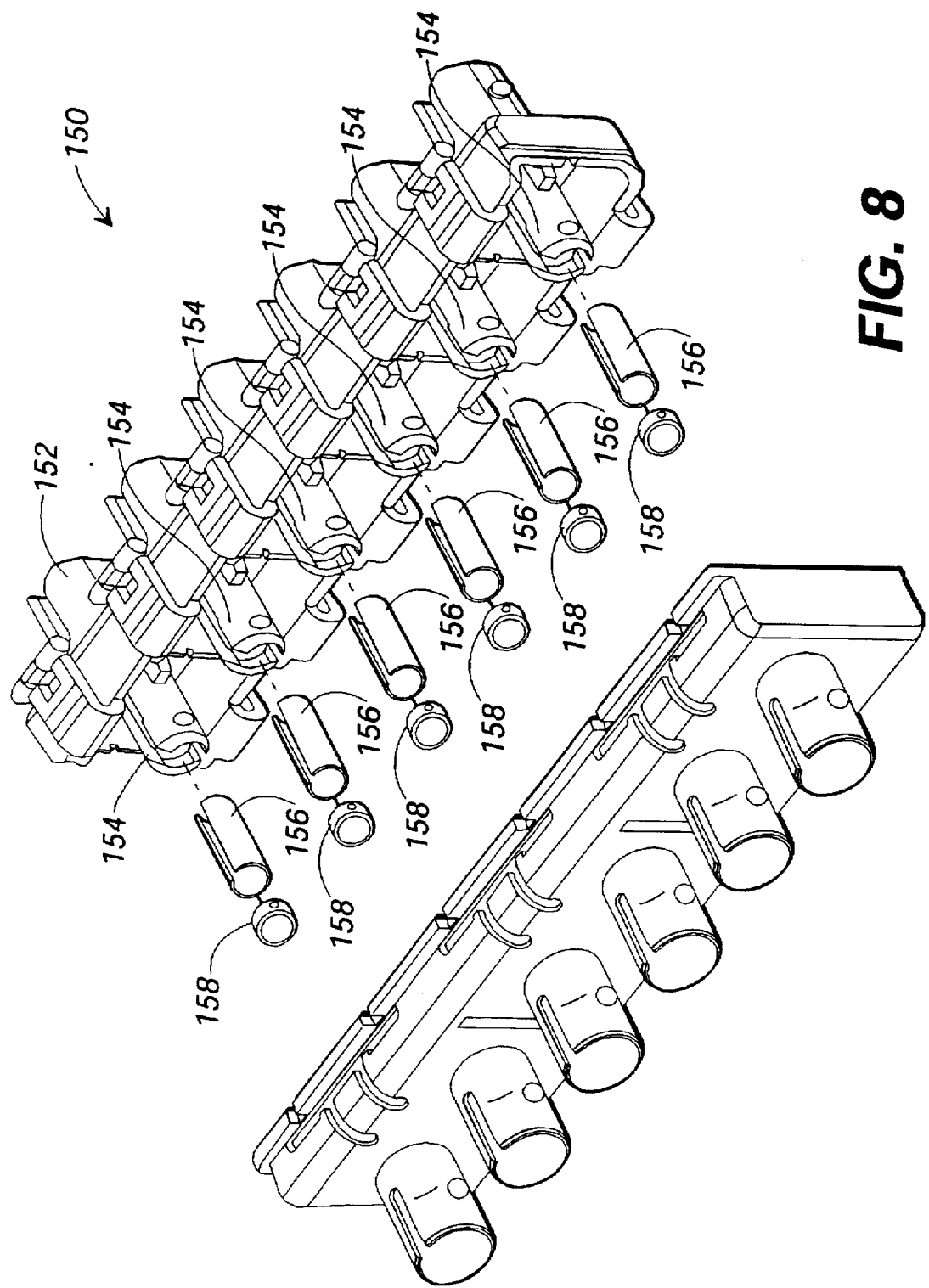
FIG. 8 is an exploded perspective view of a ganged embodiment of the buildout which uses the present invention.

Referring now to FIG. 8, because the present invention allows for the close spacing of adjacent ports, for the first time it is possible to manufacture a multiple port fiber optic coupling buildout. With reference to FIG. 8, a six port fiber optic coupling buildout 150 is shown. The six port coupling buildout 150 includes a six port buildout 152, having tubular sleeve housings 154 which will capture sleeves 156 and retain them when retainers 158 are snap locked into the tubular sleeve housings 154, in a manner similar to that previously described above with reference to FIGS. 1 and 3

As will be obvious to those skilled in the art, numerous changes to the design can be made without departing from the spirit or scope of the present invention. By way of example, the number of ports in the embodiment illustrated in FIG. 8 can be increased or decreased without departing from the present invention. Another change would be to move the retaining legs, which are shown on the block 12 in FIGS. 1–7, to the housing 26, or to place at least one leg and at least one detent on each piece, so long as they cooperatively engage. These changes are considered to be within the scope of the invention.

We claim:

1. A buildout system for optical fiber couplings comprising:
   (a) a buildout block having a longitudinal access, said buildout block comprising:
      (i) a rear portion, said rear portion of said buildout block being capable of having a connector secured thereto, and
      (ii) a front portion, said front portion of said buildout block being adapted to receive a buildout and having a block latching arrangement for retaining a buildout received thereby; and
   (b) a buildout comprising:
      (i) a front portion, said front portion of said buildout being capable of being secured to a connector; and
      (ii) a rear portion, said rear portion of said buildout being adapted to be assembled to said front portion of said buildout block, the buildout being capable of being assembled to at least one buildout block and having a buildout latching arrangement which cooperatively attaches to the block latching arrangement of said buildout block to hold said buildout assembled to said buildout block.

2. The buildout system of claim 1 wherein said latching arrangement for retaining a buildout is operable without rotation of said buildout, when said buildout is affixed to said front portion of said buildout block.

3. The buildout system of claim 2 wherein said block latching arrangement includes at least one leg and said buildout latching arrangement includes a cammed surface having a detent, said cammed surface being adapted to have said at least one leg on said block ride thereon whereby it will be received and retained by said detent when said buildout is connected to said buildout block, there being no rotation between said buildout block and said buildout upon connection of said elements.

4. The buildout system of claim 2 wherein said buildout latching arrangement includes at least one leg and said block latching arrangement includes a cammed surface having a detent, said cammed surface being adapted to have said at least one leg on said block ride thereon whereby it will be received and retained by said detent when said buildout is connected to said buildout block, there being no rotation between said buildout block and said buildout upon connection of said elements.

5. The buildout system of claim 2 wherein said buildout block has a substantially rectangular cross section in a plane which is normal to said longitudinal axis thereof.

6. The buildout system of claim 5 wherein said buildout has a substantially rectangular cross section in a plane which is normal to said longitudinal axis thereof.

7. A multi-port coupling buildout for use with optical fiber connectors comprising:

a body comprising at least two adjacent tubular members formed thereon, each of said tubular members having an outer end and being adapted to receive and retain a sleeve;

each of said tubular members having an opening extending therethrough of a diameter sufficient to receive a sleeve, and having a latching opening on the outer circumference thereof, and a sleeve retainer having at least one latching portion adapted to mate with said latching opening to retain said sleeve within said tubular member.

8. The multi-port coupling buildout of claim 7 further comprising at least one sleeve retained by at least one of said tubular members.

9. The multi-port coupling buildout of claim 7 wherein at least one of said at least one sleeve holds an attenuating piece.

\* \* \* \* \*